Patented June 1, 1926.

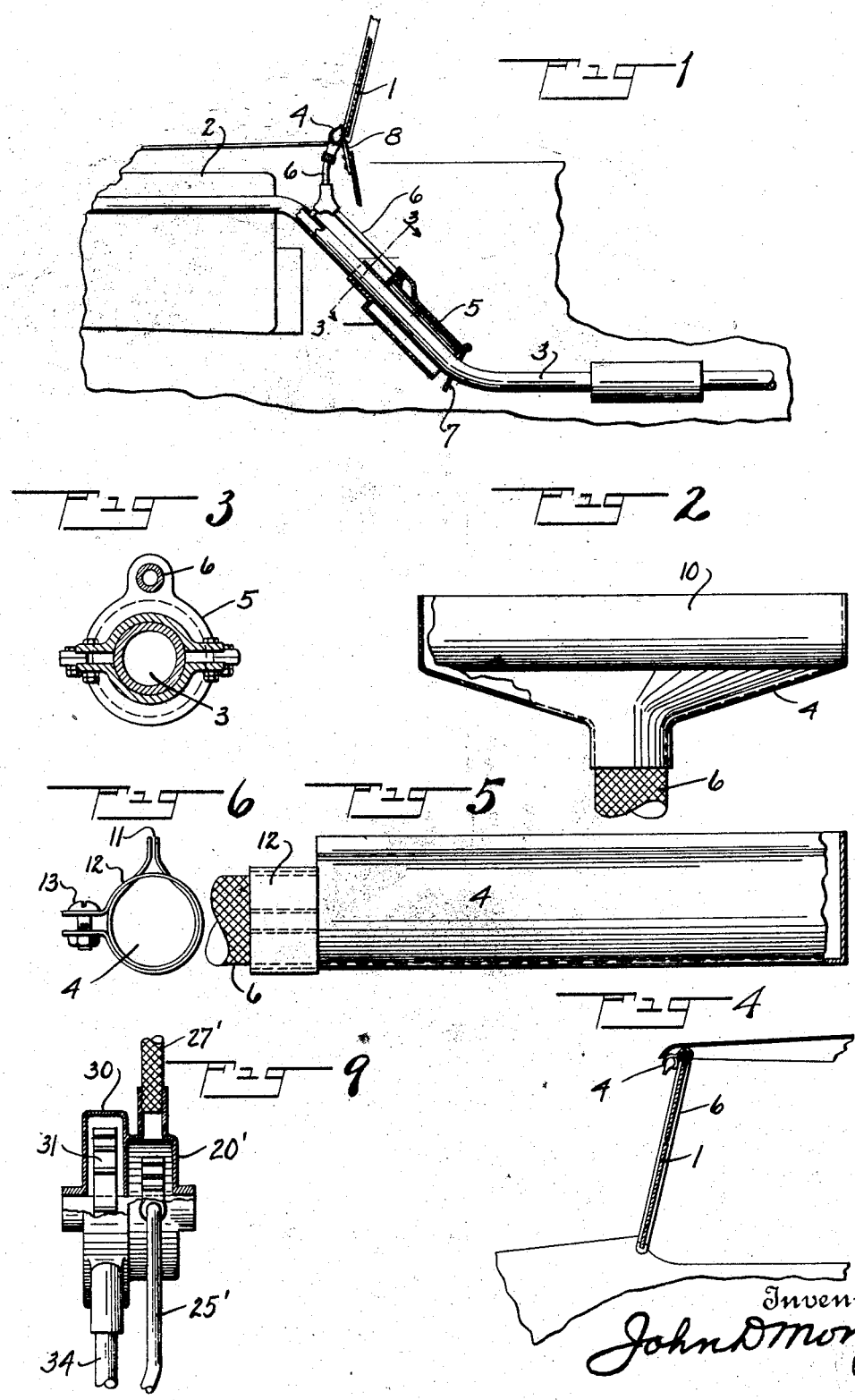

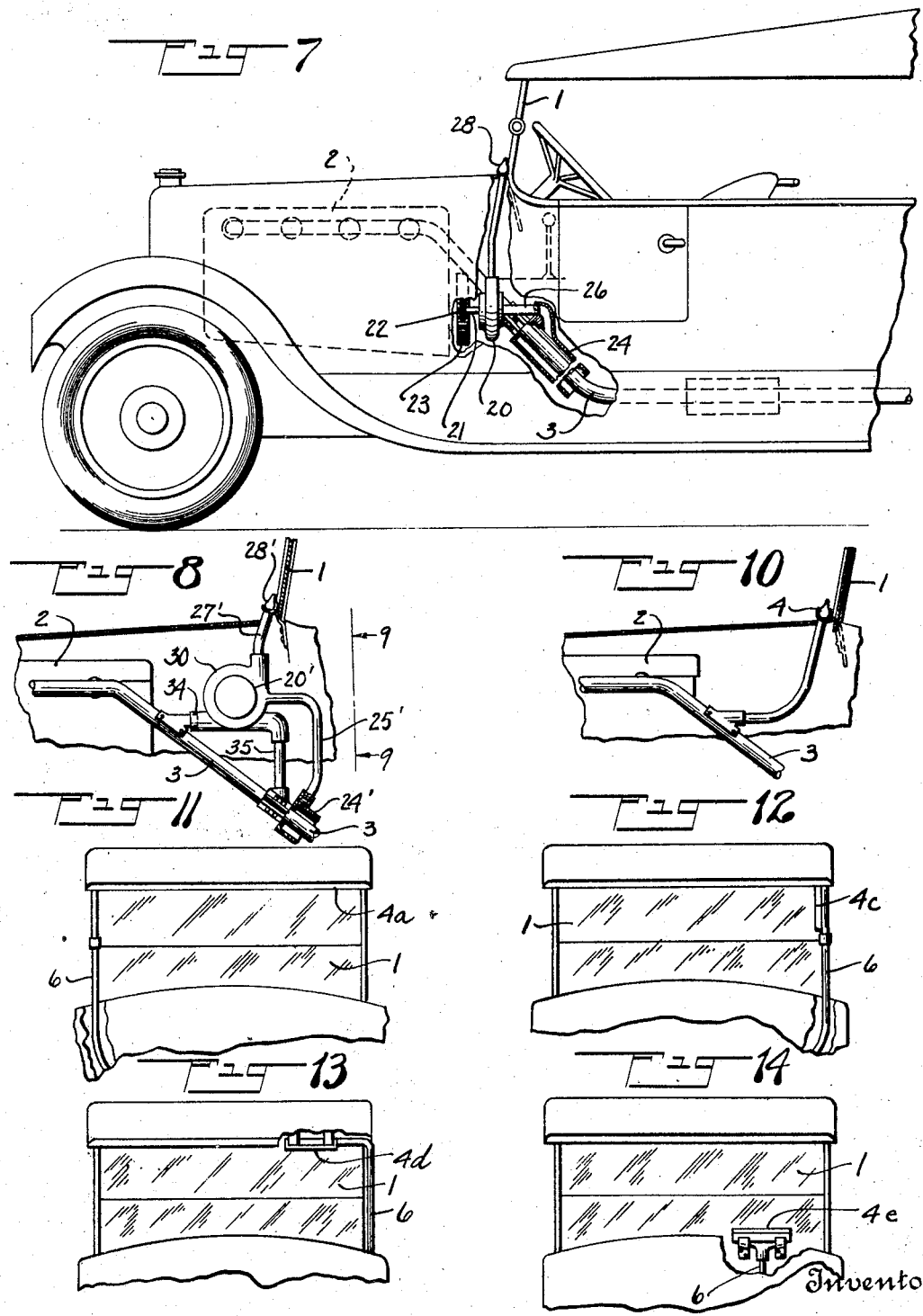

1,586,688

UNITED STATES PATENT OFFICE.

JOHN D. MORGAN, OF SUMMIT, NEW JERSEY.

CLEAR-VISION METHOD AND DEVICE FOR MOTOR VEHICLES.

Application filed September 20, 1923. Serial No. 663,876.

The invention relates to novel clear vision methods and devices for motor cars and more especially to such methods and devices operating by hot gases, or by air, or other gas currents, acting as deflectors or removers of rain, snow or the like.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a fragmentary elevation of a motor car having a clear vision device embodying the invention applied thereto;

Fig. 2 is an enlarged, fragmentary elevation of the gas discharging device;

Fig. 3 is an enlarged section taken on line 3—3 of Fig. 1;

Fig. 4 is a fragmentary elevation of parts of a motor car and showing a somewhat different form of embodying the invention;

Fig. 5 is an enlarged, fragmentary elevation of a gas discharging device;

Fig. 6 is an end elevation, looking at Fig. 5 from the left;

Fig. 7 is a fragmentary elevation of a motor car showing another form of device embodying the invention;

Fig. 8 is a like view showing a somewhat different form of device embodying the invention;

Fig. 9 is a fragmentary, enlarged elevation looking from line 9—9 of Fig. 8 in the direction of the arrows;

Fig. 10 is a fragmentary elevation and sectional view showing a somewhat different form of device embodying the invention;

Figs. 11, 12, 13 and 14 are fragmentary front elevations showing different applications of the invention.

The invention is directed to providing clear vision through the windshield of a motor car by means of a stream or sheet of air or other gas, preferably hot, directed against or contiguously to the wind shield to either remove therefrom, or to prevent the lodgement thereon, of rain, snow or the like, the air or other gas being projected or directed, and preferably heated, by the mechanism of the motor car, and usually by the hot exhaust gases.

Referring now, by way of example and explanation, to the accompanying drawings, various forms or modifications of methods and devices embodying the invention are shown, but it will be understood that such embodiments and modifications are exemplary and explanatory but are not restrictive of the invention.

In Fig. 1 of the drawings, the windshield of a motor car is indicated at 1, the engine at 2 and the exhaust manifold at 3. As here embodied, at or near the bottom edge of the windshield, and usually on the driver's side only, is a device 4 for projecting with considerable force a current, preferably a sheet, of air. In this form, the air is heated in a jacket 5 surrounding the exhaust manifold 3, the hot air being carried by a pipe 6 to the projector 4. Any suitable form of flap valve 7, or equivalent device, may be employed to prevent the escape of the hot air from the jacket, while admitting air thereto to be heated. The stream or sheet of hot air may be directed against the windshield to keep it dry, or may pass in front thereof, and substantially parallel thereto, to prevent the lodgement of rain or snow thereon. The projector 4 is supported in any suitable manner, as by brackets 8, which may be attached at any suitable or convenient place, to position the projector as desired or required to locate and direct the sheet or current of air or gas in the most efficient manner. The device will be constructed or arranged so that the current or sheet of air may be optionally directed against, or slightly spaced away from, and preferably parallel to, the windshield.

In Fig. 4 the projector 4 is shown located at the top of the windshield and adapted to project a downwardly directed sheet or current of air against or in front of the windshield. The projector 4 may have a cylindrical or other hollow body 10, and a narrow, elongated slot-like discharge orifice 11, which will eject a flat, thin sheet of air or other gas, which may be accurately placed or directed as desired. The projector is supported in suitable manner, as by a ring bracket 12, held in place by a bolt 13, the device being variably positionable as desired and may be fastened to any suitable support by its bolt 13 or any other known or suitable device.

In Fig. 7 the device is shown mechanically driven from the engine, and while equipped to project a sheet or current of hot air, it may be used for unheated air also. As here exemplarily embodied, a centrifugal air pump 20 has its shaft 21 journaled in the casing, and the shaft is provided with a driving friction pulley 22, running upon and driven by the engine fly-wheel 23. A jacket 24 surrounds the engine exhaust manifold 3 to heat the air, and the pump draws the hot air therefrom through a pipe 26. From the pump the hot air is discharged through the device 28, which may be the same as or similar to the projector 4.

In Figs. 8 and 9, the air projecting pump is driven by the exhaust gas from the engine, although it might be driven by some other air or gas current, if desired. As so embodied, a centrifugal or other suitable or known motor 30 has a vane wheel 31 driven by the engine exhaust gas supplied thereto from the manifold 3 through a pipe 34, and preferably returned to the manifold through a pipe 35. The air heater 24' delivers the hot air from about the manifold, through a pipe 25' and it is delivered from the pump 20' by a pipe 27' to projector 28'. The pump 20' may, if desired, be the same as, or similar to, the mechanically driven centrifugal pump 20, already described.

In Fig. 10 the hot exhaust gases from the manifold are used directly as the windshield protector, but in many cases this may not be the most desirable form.

In Fig. 11 the projector 4ª is shown arranged or proportioned for the full length of the windshield, and preferably at the top, although it might be arranged at the bottom or side as well. In Fig. 12 the projector 4ᶜ is shown arranged at the side upon the right. In Fig. 13 it is shown at 4ᵈ at the top at the driver's side, and in Fig. 14 at 4ᵉ at the bottom at the driver's side. It will be understood that the size and position thereof may be varied as desired.

The invention in its broader aspects is not limited to the specific mechanisms shown and described but departures may be made therefrom within the scope of the accompanying claims without departing from the principles of the invention and without sacrificing its chief advantages.

What I claim is:—

1. Means for preventing the deposition of rain and snow on a motor car windshield, including means for heating clear atmospheric air, means for placing the heated air under pressure, and means for directing a sheet of said air adjacent and substantially parallel to and spaced from the exposed face of said windshield.

2. Means for projecting a sheet of air close to and parallel with the outer surface of an automobile windshield, comprising an air intake member, a pressure creating device associated therewith and placing said air under pressure, and a flaring air projector located adjacent to and outside of said windshield and having its mouth directed to project said air substantially parallel to and spaced from the front surface of said windshield.

In testimony whereof, I have signed my name to this specification.

JOHN D. MORGAN.